(12) United States Patent
Reul et al.

(10) Patent No.: US 7,100,330 B2
(45) Date of Patent: Sep. 5, 2006

(54) DOOR MODULE SUPPORT

(75) Inventors: Dennis Reul, Schottenstein (DE); Thierry Florentin, Coburg (DE); Bertrand Stelandre, Capelle-en-Pevele (FR); Herve Leconte, La Defense (FR)

(73) Assignees: Brose Fahrzeugtelle GmbH & Co. KG, Coburg, Coburg (DE); Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/398,681

(22) PCT Filed: Oct. 9, 2001

(86) PCT No.: PCT/DE01/03872

§ 371 (c)(1), (2), (4) Date: Sep. 16, 2003

(87) PCT Pub. No.: WO02/30695

PCT Pub. Date: Apr. 18, 2002

(65) Prior Publication Data

US 2004/0049988 A1 Mar. 18, 2004

(30) Foreign Application Priority Data

Oct. 10, 2000 (DE) ................. 100 50 322

(51) Int. Cl.
*B60J 5/04* (2006.01)

(52) U.S. Cl. ................ 49/502; 296/146.7

(58) Field of Classification Search .......... 49/502; 296/146.5, 146.7
See application file for complete search history.

(56) References Cited

U.S. PATENT DOCUMENTS 4,648,208 A * 3/1987 Baldamus et al. ........... 49/502

(Continued)

FOREIGN PATENT DOCUMENTS

WO WO 96/28314 9/1996

OTHER PUBLICATIONS

International Search Report of PCT/DE01/09872, dated Feb. 22, 2002.

(Continued)

*Primary Examiner*—Jerry Redman
(74) *Attorney, Agent, or Firm*—Christie, Parker & Hale, LLP (57) ABSTRACT

A door module support, for fixing to a door body, between the damp space and the dry space of a motor vehicle, having a support plate for the location of functional elements of a vehicle door, for example, a window winder, a doorlock, door handle and/or a door internal cladding, first fixing points on for the support plate which serve for the fixing of the support plate to the door body. In the mounted state thereof, one surface of the support plate is facing the damp space and the other surface is facing the dry space with a sealing contour around the edge thereof, along which the support plate lies against the door body in a sealed manner when in the mounted state. The support plate further includes second fixing points, for the fixing of at least one functional element to the support plate. At least a part of the second fixing points is provided in fixing regions which are formed on the section of the support plate which lies outside the part surrounding the sealing contour and which extend into the dry space.

14 Claims, 5 Drawing Sheets

U.S. PATENT DOCUMENTS

| | | | |
|---|---|---|---|
| 5,529,370 A * | 6/1996 | Veit | 296/146.7 |
| 5,802,770 A | 9/1998 | Kavanagh et al. | |
| 5,902,004 A | 5/1999 | Waltz et al. | |
| 5,906,072 A | 5/1999 | Feige et al. | |
| 6,176,542 B1 * | 1/2001 | Gooding et al. | 296/146.6 |
| 6,185,874 B1 * | 2/2001 | Barrero Serrano et al. | 49/502 |
| 6,453,615 B1 * | 9/2002 | Berta et al. | 49/349 |
| 6,616,216 B1 * | 9/2003 | Furuyama et al. | 296/146.7 |
| 2003/0097797 A1 * | 5/2003 | Cucchiara et al. | 49/502 |

OTHER PUBLICATIONS

International Preliminary Examination Report of PCT/DE01/03872, dated Sep. 26, 2002.

* cited by examiner

DOOR MODULE SUPPORT

CROSS-REFERENCE TO RELATED APPLICATION

This application is a National Phase Patent Application of International Application Number PCT/DE01/03872, filed on Oct. 9, 2001, which claims priority of German Patent Application Number 100 50 322.5, filed Oct. 10, 2000.

BACKGROUND

A door module support is used for fixing on a door body, e.g. on the door inside skin of a motor vehicle door, between the wet space and dry space of a vehicle and is formed by a support plate which can hold a number of different functional elements of a vehicle door, such as for example a window lifter, a door lock, a door handle, cable wires and door inside trim. These functional elements can be assembled with the door module support into a pre-fitted precheckable structural group (door module) which is fixed as one whole unit on the door body of a vehicle door.

To this end the door module support has first fixing points which serve to fix the support plate on the said door body wherein in the fastened state one surface of the support plate faces the dry space of the vehicle and the other surface of the support plate faces the wet space of the vehicle. The support plate thereby adjoins the door body with a circumferential sealing profile (which is uniform around the edge) so that a fluid-tight separation between the wet space and dry space of the vehicle door is guaranteed. The support plate can thereby adjoin the door body in particular through a sealing track or comparable sealing elements.

Furthermore the support plate has two fixing sites which are provided on the support plate for fixing the aforesaid functional elements.

A door module support of this kind is known for example from WO 96/28314.

SUMMARY

The object of the invention is to improve a door module support of the kind mentioned above, more particularly in respect of fixing the functional elements on the door module support.

According to this at least one part of the second fixing sites is provided on at least one fixing area which is formed on the support plate outside of the section enclosed by the sealing profile and which projects into the dry space of the vehicle.

By arranging the fixing sites according to the invention on fixing areas which are outside of the sealing profile of the support plate in the dry space it is ensured that these fixing sites (which are often formed by fixing openings) do not impair the separation between the wet and dry spaces. More particularly it is not necessary to provide additional measures in the region of the said fixing sites for the purpose of sealing the dry space from the wet space.

The arrangement of the fixing sites according to the invention can be used for different functional elements which are to be fixed on the door module support, e.g. for cable wires, door handles and/or parts of the closing system.

However the arrangement is used with particular advantage when fixing a door inside trim on the door module support.

Depending on the type of use the fixing areas can be formed at different places on the support plate and can even protrude in different directions from the support plate, for example in the plane defined by the support plate or even out from this plane.

Furthermore it can be proposed that the fixing areas which are formed on the support plate outside of the sealing profile are guided inwards over the support plate when this is an advantage for a particular type of fixing. In the case of support plates made from sheet metal the fixing areas can for this purpose be bent round to the inside. If however the support plate is made from plastic then a hinge can be provided here for this purpose or the corresponding fixing area is moulded directly so that it extends inwards from outside of the sealing profile and over the support plate.

A certain elasticity of the fixing areas makes it possible to compensate for tolerances when fixing the door inside trim relative to the door module support.

The fixing sites are preferably designed so that the connection with a functional element to be fixed on the support plate can be produced by a fixing hook which engages in an associated fixing opening wherein either the fixing openings or the fixing hooks can be selectively provided on the fixing areas. At least one fixing element of a different type is then provided on the associated functional element.

If the support plate or functional element is made from plastic then the fixing hooks can be moulded integral therewith in simple manner.

The use of fixing hooks for fixing functional elements on the support plate has the advantage over conventional fixing means, such as for example clips, screw connections or rivet connections, that during assembly or transport no fixing means can become lost (as for example in the case of screw or rivet connections) and also that there is no special danger of the fixing means breaking off (as for example in the case of resilient clips).

The fixing openings are preferably formed by slits in which the fixing hooks can be inserted and in which the fixing hooks can be moved in the longitudinal direction of the slit.

Several fixing openings (slits) provided for fixing a functional element can hereby run parallel so that in order to fit the corresponding functional element the relevant fixing hooks are threaded into the associated slits and then moved along the longitudinal direction of the slits into their end position (function position).

According to one embodiment of the invention which can be used in particular to fix a door inside trim on the door module support, the slits run substantially in the vertical direction (along the vehicle z-axis) when the door module support is fixed on the door body. This type of fixing between the door inside trim and a door module support is particularly advantageous when the vehicle door is designed for possible side impact (side crash).

To fix a door inside trim on the door module support it is possible to provide in addition to the slits running in the z-direction even more fixing sites at fixing areas which are formed on the underneath of the door module support and protrude substantially transversely therefrom.

BRIEF DESCRIPTION OF THE DRAWINGS

Further features and advantages of the invention will now be explained with reference to the embodiment shown in the drawings in which:

FIG. 4b shows part of the section of FIG. 4a;

DETAILED DESCRIPTION

Figure 4A:
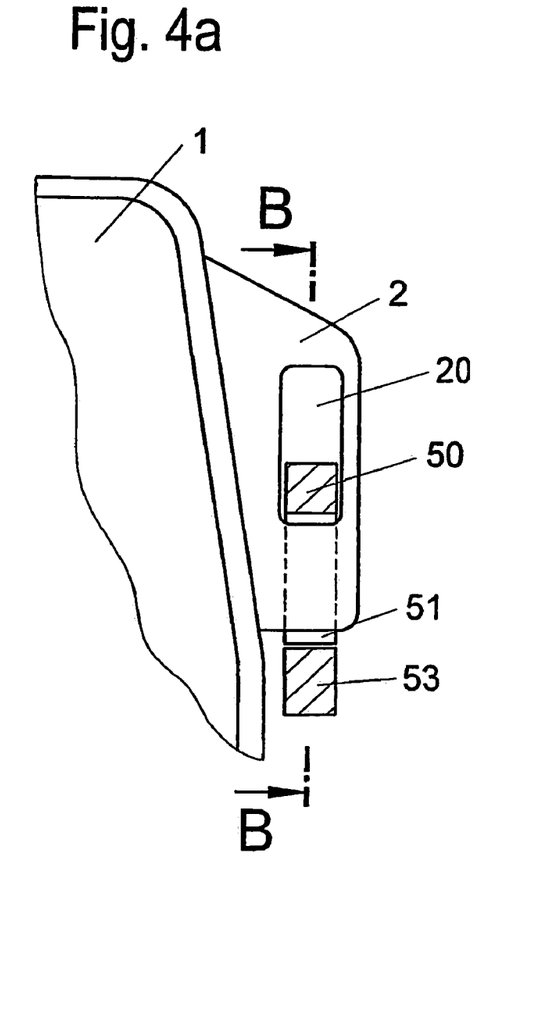
FIG. 4a shows a section of a further modification of the door module support of FIG. 1 in the region of a fixing site through which a door inside trim is fixed on the door module support.
Figure 4B:
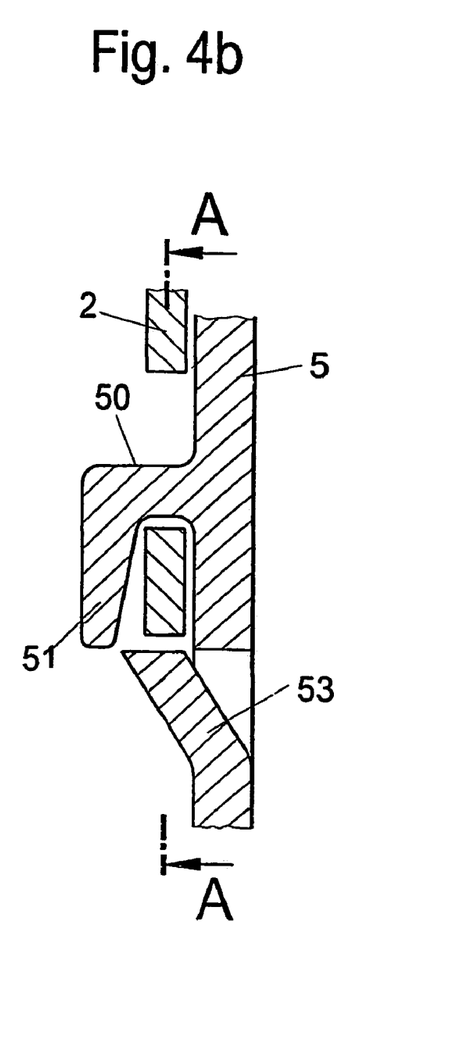
Figure 5:
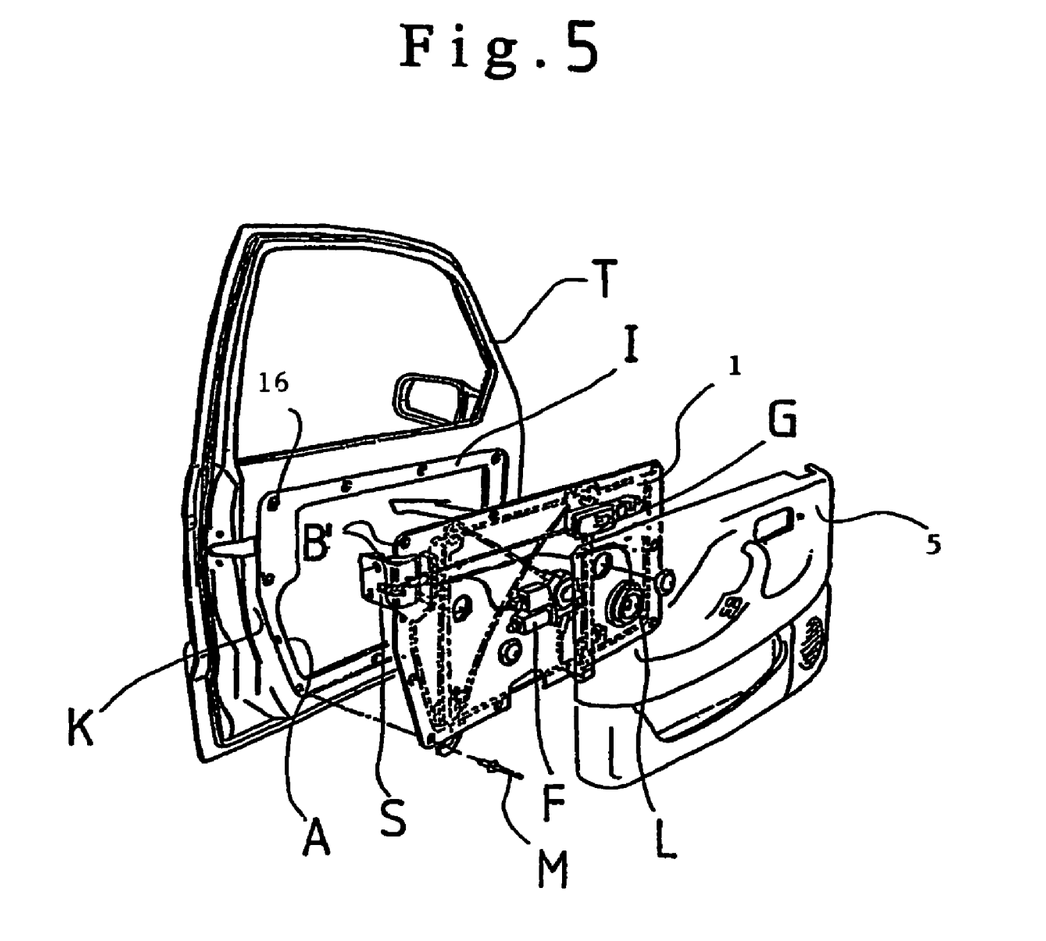
FIG. 5 shows a diagrammatic view of a vehicle door with a door module support.

FIG. 5 shows a motor vehicle door T having a door body K whose inner skin I (e.g. inside panel) has a large surface recess A which is covered by a support plate P of a door module. The support plate P is connected to the door inside skin I through fixing sites B, B' on the door inside skin I on one side and the support plate P on the other and through associated fixing means M. The support plate P supports for example a window lifter F, a door operating handle G, a speaker L and a door lock S, whereby one door module is formed which can be preassembled and prechecked. This assembly is covered on the inside by a door inside trim V which is apparent in FIGS. 4a and 4b (at 5) and which is connected to the door T, e.g. to the support plate P (1 in FIG. 4a), in a manner which is not described in further detail.

The door inside skin I and the support plate P fixed thereon form a partition wall through which the wet space of the door is separated from the dry space of the vehicle.

Figure 1:
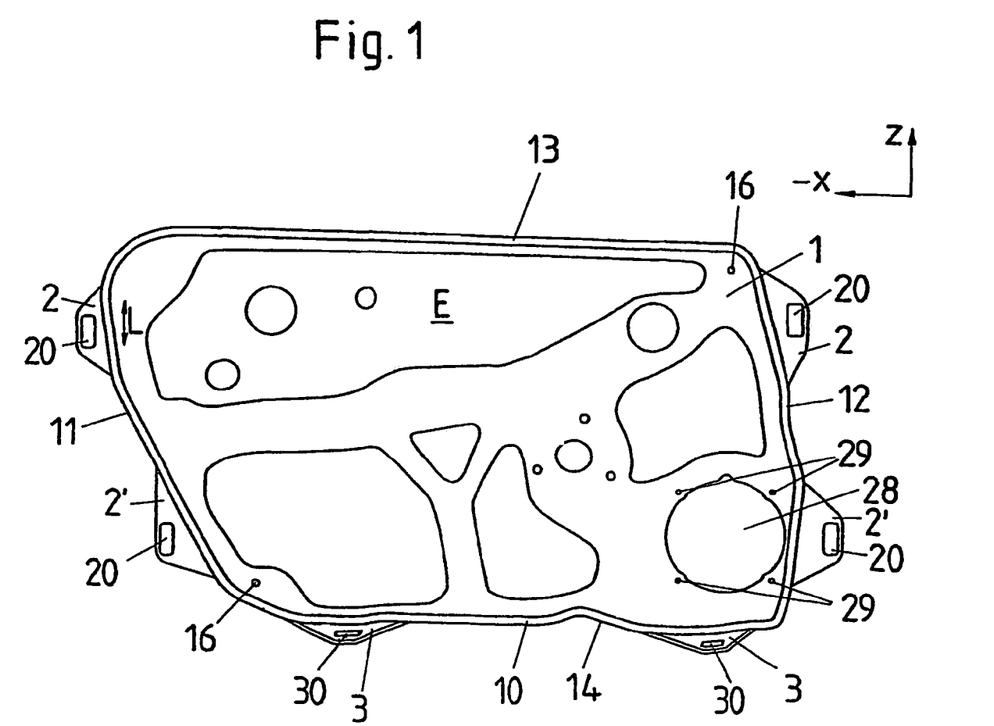
FIG. 1 shows a door module support which can be fixed on the door body of a motor vehicle door and which serves to hold different functional elements of the vehicle door.

FIG. 1 shows a door module support designed according to the invention and having a support plate 1 which can serve to hold or house different function components of a vehicle door, such as for example a window lifter, a door lock, a speaker (e.g. separate woofers and tweeters), a door handle, parts of the closing system, an airbag module, a light, cable wires as well as door inside trim.

The support plate 1 is fixable on the door body of a vehicle door, more particularly on its inner skin, by means of first fixing sites 16 of which only two are shown by way of example in FIG. 1, and the support plate forms there a constituent part of a partition wall which separates the wet space from the dry space of the vehicle. In order to ensure a sealing separation here the support plate has a circumferential sealing profile 10 by which the support plate 1 adjoins the door body, e.g. through a sealing track running along the sealing profile 10 so that a moisture-tight contact bearing is ensured between the support plate 1 and door body.

Apart from the first fixing sites 16 already mentioned which serve to fix the support plate 1 against a door body, the support plate 1 also has a number of further fixing openings as well as socket openings for functional elements of a vehicle door. By way of example a socket 28 is mentioned here for a speaker which is surrounded by four fixing sites 29 for fixing the speaker on the support plate 1.

Outside of the sealing profile 10 there are overall six fixing areas 2, 2', 3 formed on the support plate 1 and serving to fix the door inside trim on the support plate 1. Four fixing areas 2, 2' are thereby formed opposite one another in pairs on the two end sides 11, 12 of the support plate which are spaced from each other in the longitudinal direction x of the vehicle (in relation to the orientation of the support plate 1 in the state in which it is installed in a vehicle door)—i.e. between the upper edge 13 and lower edge 14 of the support plate. These fixing areas each thereby protrude from the support plate 1 in the plane E defined by same. Each of these fixing areas 2, 2' has a fixing opening 20 in the form of a slit which extends in a direction L parallel to the vertical vehicle axis (z-axis). These slits 20 are formed so that they can serve to hold a hook for fixing purposes.

Two further fixing areas 3 are formed on the lower edge 1 of the support plate 1 and protrude substantially perpendicularly therefrom, namely in the direction towards the dry space (in relation to the state in which the support plate is installed into a vehicle door). Each of these fixing areas 3 has fixing openings 30 into which a projection of the inner trim can project for the purpose of fixing the door inside trim on the support plate 1.

All the fixing areas 2, 2', 3 provided outside of the sealing profile thereby extend completely in the dry space T (see FIG. 2a) of a vehicle.

Figure 2A:
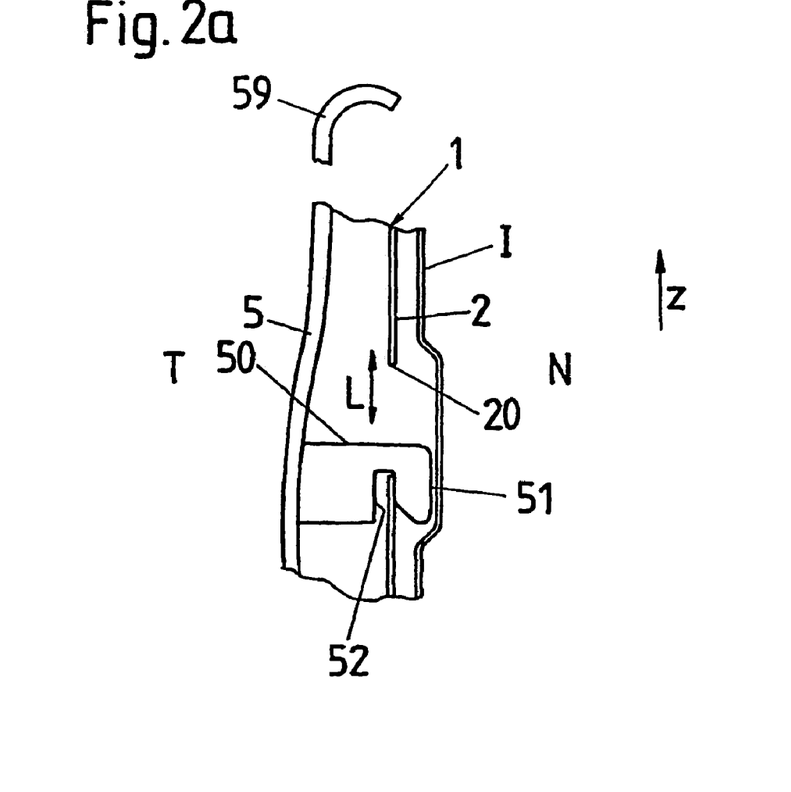
FIG. 2a shows a section of the door module support from FIG. 1 in the area of a fixing site through which a door inside trim is fixed on the door module support.

FIG. 2a shows a section of the door module support according to FIG. 1 in the region of a fixing area 2 as well as the associated slit 20 in cross section. Furthermore FIG. 2a also shows a part of the door body, more precisely a part of the door inner skin I on which the support plate 1 is fixed. The support plate thereby normally covers a large-surface area cut-out section in the inner skin I whose shape matches that of the support plate 1. The door inner skin I and the support plate 1 together form a partition wall through which the dry space T of the vehicle is separated from the wet space N. The wet space is thereby formed through those parts of the door which towards the outside adjoin the partition wall formed by the inner skin I and support plate 1 whilst the dry space T lies on the side of the said partition facing the interior of the vehicle.

Furthermore FIG. 2a shows a part of a door inside trim 5 which is fixed on the support plate 1, namely through hooks 50 which engage in the slits 20 of the fixing areas 2. The hook 50 hereby engages by an angled end section 51 behind the lower edge of the slit 20 so that the lower edge of the slit 20 engages in a recess 52 of the hook 50 adjoining the angled end 51. Also at the other fixing areas 2, 2' hooks 50 of the door inside trim 5 engage into the slits 20 which are provided at the fixing areas 2, 2'.

It can be seen that the hook 50 is displaceable in the slit 20 in the longitudinal direction L of the slit parallel to the z-axis. The connection between the door inside trim and the support plate 1 can hereby be released by pushing the door inside trim 5 together with the hook 50 formed integral therewith up along the z-axis and then removing same from the support plate 1 in the direction of the dry space T.

The extension direction L of the slits can have a component in the longitudinal direction x of the vehicle whereby a play-free assembly of the door inside trim in the vehicle door becomes easier since during assembly the door inside trim 5 can execute at the same time a movement in the longitudinal direction x of the vehicle and is thereby pressed against an end side of the door.

The hooks 50 and the associated slits 20 are moreover generally suitable for fixing function groups on a vehicle door, thus even when the fixing sites lie inside and not outside the sealing profile 10.

Finally in FIG. 2a the upper end of the door inside trim 5 is shown which has an angled end section 59 which enables the door inside trim to be hung in the region of the door sill.

Figure 2B:
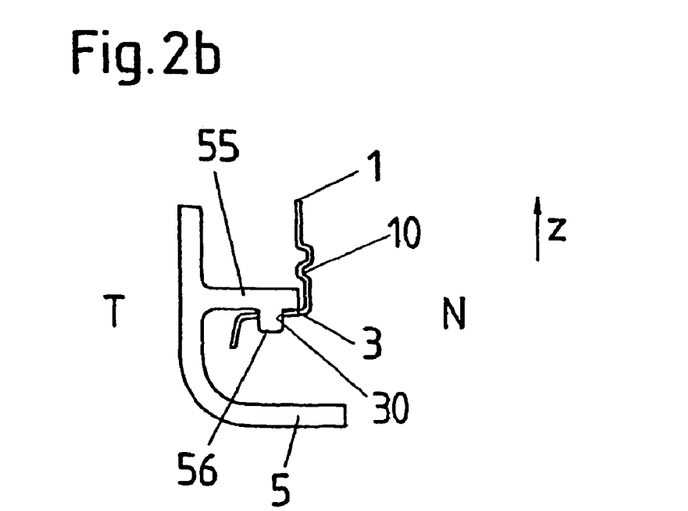
FIG. 2b shows a further section of the door module support of FIG. 1 in the region of a fixing site through which the door inside trim is fixed on the door module support.

FIG. 2b shows in cross-section a cut-out section of the support plate 1 according to FIG. 1 in the region of a fixing area 3 which protrudes underneath the sealing profile 10 perpendicularly from the support plate 1 in the direction of the dry space T. The door inside trim 5 has in its lower end area a section 55 which is angled towards the support plate 1 by a projection 56 which protrudes down (opposite the z-direction) and which can slide into the fixing opening 30

(see FIG. 1) of the fixing area 3. An additional fixing of the door inside trim 5 on the support plate 1 is produced in the region of its lower end. This connection can also be released by sliding the door inside trim 5 up along the z-direction.

Figure 3:
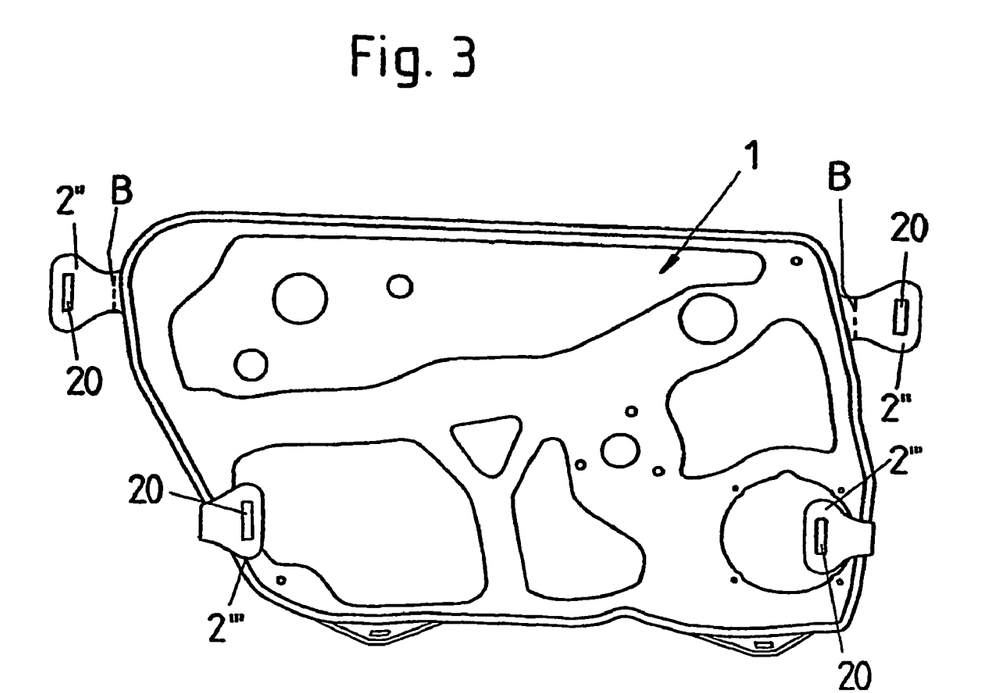
FIG. 3 shows a modification of the door module support of FIG. 1.

FIG. 3 shows a modification of the embodiment of FIG. 1 in which the differences lie only in the configuration of the side fixing areas formed on the support plate 1. These fixing areas 2", 2''' each have a bending edge B around which they can be bent inwards over the support plate 1. FIG. 3 shows the upper side fixing areas 2" prior to bending inwards and the lower side fixing area 2''' after bending inwards. Also these fixing areas 2", 2''' each have fixing openings in the form of slits 20 which serve for holding a door inside trim in the same way as in the embodiment illustrated in FIGS. 1 and 2.

If instead of a conventional door module support of metal, a door module support is used which is made of plastic then hinges, e.g. film hinges, can be provided in place of bending areas B so that the fixing areas can be folded round to the inside.

FIGS. 4a and 4b show a cut out section of a modification of the door module support according to FIG. 1 in the region of a fixing area 2 as well as the associated slit 20. The door inside trim 5 hereby has additionally in the region of the hook 50 an integral moulded elastic snap-fit element 53 which protrudes from the door inside trim 5 and which when the hook 50 is inserted in the slit 20 is pressed sideways out of the way through the support plate 1 and which after the hook 50 is inserted into the slit secures the hook 50 against slipping through out from the slit 20. In order to remove the hook 50 out from the slit 20 this snap-fit element 53 must first be operated by means of a suitable tool (pushed sideways out of the way).

The fixing areas illustrated in FIGS. 1 to 4b and the associated slits can also undertake further functions as transport aids, grip tabs or as reference points during assembly.

Furthermore with the embodiments illustrated in FIGS. 1 to 4b the hooks can each be provided on the fixing sections of the support plate and the slits on the door inside trim. This is particularly advantageous when the support plate 1 is made from plastics.

Furthermore additional structural elements which are required for assembly can be fixed on the fixing areas and can then be broken off.

Finally the part of the dry space T of the vehicle door which extends between the support plate 1 and the door inside trim 5 can be used as or for a shelf.

The invention claimed is:

1. A door assembly for a motor vehicle comprising:
   a door body;
   at least one functional element of the door assembly, the at least one functional element having a fixing hook; and
   a support plate positioned between a wet space and a dry space of the motor vehicle and configured to hold the at least one functional element of the door assembly, wherein the support plate is fixed to the door body, the support plate comprising:
   a circumferential sealing profile around the support plate by which the support plate fits sealingly against the door body;
   first fixing sites located within the sealing profile and by which the support plate is fixed to the door body, wherein one surface of the support plate faces the dry space and another surface of the support plate faces the wet space; and
   second fixing sites located outside the sealing profile, each second fixing site having a fixing opening engaged by the fixing hook of the at least one functional element, wherein the second fixing sites project into the dry space.

2. The door assembly according to claim 1 wherein the second fixing sites protrude away from the support plate in a plane defined by the support plate.

3. The door assembly of claim 2, wherein additional second fixing sites protrude from the support plate at an angle to a plane defined by the support plate.

4. The door assembly according to claim 1 wherein the second fixing sites protrude from the support plate at an angle to a plane defined by the support plate.

5. The door assembly of claim 4 wherein the second fixing sites protrude from the support plate at a right angle.

6. The door assembly according to claim 1 wherein the second fixing sites are guided inwards over the support plate.

7. A door assembly for a motor vehicle comprising:
   a door body;
   at least one functional element of the door assembly, the at least one functional element having a fixing opening; and
   a support plate positioned between a wet space and a dry space of the motor vehicle and configured to hold the at least one functional element of the door assembly, wherein the support plate is fixed to the door body, the support plate comprising:
   a circumferential sealing profile around the support plate by which the support plate fits sealingly against the door body;
   first fixing sites located within the sealing profile and by which the support plate is fixed to the door body, wherein one surface of the support plate faces the dry space and another surface of the support plate faces the wet space; and
   second fixing sites located outside the sealing profile, each second fixing site having a fixing hook engaging the fixing opening of the at least one functional element, wherein the second fixing sites project into the dry space.

8. The door assembly according to claim 1 or 7 wherein the fixing openings are formed by slits into which the fixing hooks can be inserted and in which the fixing hooks can be displaced in the longitudinal direction of the slits.

9. The door assembly according to claim 8 wherein several fixing openings run parallel to each other.

10. The door assembly according to claim 8 wherein the slits have a component in a vertical direction.

11. The door assembly according to claim 10 wherein the second fixing sites protrude from end sides of the support plate and are spaced from each other in a longitudinal direction of the motor vehicle.

12. The door assembly according to claim 11 wherein additional second fixing sites protrude from a lower edge of the support plate.

13. The door assembly according to claim 7 wherein one of the at least one functional elements is a door inside trim fixed on the second fixing sites.

14. The door assembly according to claim 7 wherein the at least one functional element comprises at least one of an airbag module, a light unit, speaker unit, cable wiring, door handle and parts of a closing system.

* * * * *

UNITED STATES PATENT AND TRADEMARK OFFICE
CERTIFICATE OF CORRECTION

| | |
|---|---|
| PATENT NO. | : 7,100,330 B2 |
| APPLICATION NO. | : 10/398681 |
| DATED | : September 5, 2006 |
| INVENTOR(S) | : Reul et al. |

It is certified that error appears in the above-identified patent and that said Letters Patent is hereby corrected as shown below:

On the Title Page,

Item (73) Assignees:   Delete "Fahrzeugtelle",
Insert --Fahrzeugteile--

Signed and Sealed this

Seventeenth Day of April, 2007

JON W. DUDAS
*Director of the United States Patent and Trademark Office*